(12) United States Patent
Nishitani

(10) Patent No.: US 7,850,808 B2
(45) Date of Patent: Dec. 14, 2010

(54) PNEUMATIC TIRE AND PRODUCING METHOD OF PNEUMATIC TIRE

(75) Inventor: Kazuma Nishitani, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 1069 days.

(21) Appl. No.: 11/466,372

(22) Filed: Aug. 22, 2006

(65) Prior Publication Data

US 2007/0044884 A1 Mar. 1, 2007

(30) Foreign Application Priority Data

Aug. 23, 2005 (JP) ............... 2005-241256

(51) Int. Cl.
- *B29D 30/06* (2006.01)
- *B60C 5/00* (2006.01)
- *B60C 5/14* (2006.01)

(52) U.S. Cl. .............. 156/110.1; 156/123; 152/510

(58) Field of Classification Search .......... 156/123; 152/510

See application file for complete search history.

(56) References Cited

U.S. PATENT DOCUMENTS

| 6,261,399 B1* | 7/2001 | Roesgen et al. ............ 156/123 |
| 6,398,893 B1* | 6/2002 | Shida ...................... 156/130 |
| 6,988,522 B2* | 1/2006 | Colantonio et al. ......... 152/517 |

FOREIGN PATENT DOCUMENTS

| JP | 09029858 | * | 2/1997 |
| JP | 2000-94542 A | | 4/2000 |
| JP | 2002018973 | * | 1/2002 |
| JP | 2002-79590 A | | 3/2002 |
| JP | 2002-160508 A | | 6/2002 |
| JP | 2002-178415 A | | 6/2002 |

* cited by examiner

*Primary Examiner*—Justin Fischer
(74) *Attorney, Agent, or Firm*—Knobbe Martens Olson & Bear LLP

(57) ABSTRACT

In a pneumatic tire whose tire cross section height is less than 110 mm and which has an inner liner layer disposed inside of a carcass layer, the inner liner layer has a wide rubber ribbon region formed by spirally winding a wide rubber ribbon along a tire circumferential direction, a wide rubber ribbon of an innermost peripheral side forms a tire inner peripheral surface of a region extending at least from the vicinity of an end of a belt layer to a tire cross section maximum width position.

1 Claim, 3 Drawing Sheets

PNEUMATIC TIRE AND PRODUCING METHOD OF PNEUMATIC TIRE

BACKGROUND OF THE INVENTION

1. Field of the Invention

The present invention relates to a pneumatic tire in which a crack is prevented from being generated in an inner peripheral surface of the tire, and to a producing method of the pneumatic tire.

2. Description of the Related Art

Conventionally, as a forming method of a rubber member such as an inner liner member, there is known a ribbon winding technique. According to the ribbon winding technique, as disclosed in a Japanese Patent Application Laid-open No. 2002-178415, a rubber ribbon made of unvulcanized rubber composite having small width and small thickness is wound along a circumferential direction a plurality of times and a rubber member having desired cross section shape can be formed. With this, the rubber member can easily be formed precisely as compared with a case in which a cut rubber extrudate is formed continuously in an annular shape.

When a pneumatic tire in which a tire cross section height is less than 110 mm and an aspect ratio (tire cross section height/tire cross section width) is small is formed using an inner liner member formed by the ribbon winding technique, however, it was found that the following inconvenience occurred. That is, in the case of the pneumatic tire whose tire cross section height is less than 110 mm, since large distortion is applied to a portion of the tire from the vicinity of an end of a belt layer to the tire cross section maximum width position during running, a crack is generated from a ribbon interface formed in the inner peripheral surface of the tire in that region, and the endurance of the tire is deteriorated.

A Japanese Patent Application Laid-open No. 2002-160508 discloses a pneumatic tire in which the inner liner member is formed by the ribbon winding technique, and an insulation rubber extending from the vicinity of an end of the belt layer to the tire cross section maximum width position is disposed between the inner liner member and a carcass ply. According to this pneumatic tire, however, since the ribbon interface is uniformly formed in the tire inner peripheral surface, the problem of a crack in the inner peripheral surface cannot be solved.

A Japanese Patent Application Laid-open No. 2002-79590 discloses a method for forming a tire inner peripheral surface of the inner liner member by a surface layer formed by winding a rubber ribbon whose width is less than 40 mm with a predetermined superposed width. According to this method, however, the relatively narrow rubber ribbon must be used, the ribbon interface is formed in the tire inner peripheral surface in a region where a large distortion is applied at the time of running in the pneumatic tire whose tire cross section height is less than 110 mm, and a crack can not be prevented from being generated in the inner peripheral surface.

A Japanese Patent Application Laid-open No. 2000-94542 discloses a method in which rubber ribbons are wound around both edges of an integrally extruded rubber extrudate to form an inner liner member. However, this method is for reducing the number of the winding steps of the rubber ribbon and enhancing the productivity by using the rubber extrudate, and this method is not for forming the inner liner member by the ribbon winding technique alone. To solve the problem of a crack on the inner peripheral surface, it is very important to reduce the ribbon interface in the tire inner peripheral surface in a region where a large distortion is applied during running, but none of the above producing methods disclose this point.

SUMMARY OF THE INVENTION

The present invention has been accomplished in view of the above circumferences, and it is an object of the invention to provide a pneumatic tire in which a crack is prevented from being generated in an inner peripheral surface of the tire in a region where a large distortion is applied during running, and to provide a producing method of the pneumatic tire.

The object can be achieved by the present invention having the following structure.

That is, the present invention provides a pneumatic tire whose tire cross section height is less than 110 mm, the tire comprising a carcass layer which is disposed such as to extend between a pair of beads, a belt layer disposed outside of a tread portion of the carcass layer, and an inner liner layer disposed on an inner side of the tire than the carcass layer, wherein the inner liner layer has a wide rubber ribbon region formed by spirally winding a wide rubber ribbon along a tire circumferential direction, the wide rubber ribbon of an innermost peripheral side forms a tire inner peripheral surface of at least a region extending from the vicinity of an end of the belt layer to a tire cross section maximum width position.

According to the above structure, of wide rubber ribbons constituting a wide rubber ribbon region of the inner liner layer, the innermost peripheral side wide rubber ribbon forms a tire inner peripheral surface at least of a region from the vicinity of the end of the belt layer to the tire cross section maximum width position. Therefore, in the pneumatic tire whose tire cross section height is less than 110 mm, it is possible to reduce the ribbon interface in a tire inner peripheral surface in a region where a large distortion is applied during running, and to suppress a crack in a inner peripheral surface which may be generated due to the ribbon interface.

In the above pneumatic tire, it is preferable that the wide rubber ribbon region is formed by winding a wide rubber ribbon whose width exceeds 60 mm toward an outer side of the tire such that the wide rubber ribbon is deviated radially inward of the tire, the wide rubber ribbon region is disposed such as to extend from the vicinity of the end of the belt layer to the radially inner end of the tire.

According to the above structure, the wide rubber ribbon region is formed by winding the wide rubber ribbon whose width exceeds 60 mm. Therefore, it is possible to efficiently reduce the ribbon interface of the tire inner peripheral surface including a region where a large distortion is applied during running in the pneumatic tire whose tire cross section height is less than 110 mm. The wide rubber ribbon region is formed by winding the wide rubber ribbon such that the wide rubber ribbon is deviated in a radially inward of the tire toward the outer side of the tire, and the wide rubber ribbon region is disposed from the vicinity of the end of the belt layer to the tire radially inner side. Therefore, the ribbon interface formed between the wide rubber ribbons is disposed near the tire radially inner end of the inner liner layer. As a result, the ribbon interface between the wide rubber ribbons is not formed near the region where a large distortion is applied during running, and it is possible to restrain a crack from being generated in the inner peripheral surface more effectively.

In the above pneumatic tire, it is preferable that the inner liner layer comprises the wide rubber ribbon region, and a narrow rubber ribbon region, the narrow rubber ribbon region is formed by spirally winding a narrow rubber ribbon having a width smaller than that of the wide rubber ribbon along the tire circumferential direction, the narrow rubber ribbon region is connected to the edge of the wide rubber ribbon region.

According to the above structure, it is possible to enhance the weight balance and uniformity of the inner liner member constituting the inner liner layer, and to excellently secure the uniformity of the tire even if the wide rubber ribbon is used.

Further, the present invention provides a producing method of a pneumatic tire having a step for forming an inner liner layer and disposing the same on a tire inner peripheral surface as an inner liner layer, wherein a wide rubber ribbon is spirally wound along a circumferential direction, a wide rubber ribbon region constituting the inner liner member is formed, a tire inner peripheral surface of a region extending at least from the vicinity of an end of a belt layer to a tire cross section maximum width position is formed by the wide rubber ribbon of an innermost peripheral side.

According to the producing method of the pneumatic tire of the invention, the tire inner peripheral surface at least of the region from the vicinity of the end of the belt layer to the tire cross section maximum width position is formed by the wide rubber ribbon of the innermost peripheral side. With this, the ribbon interface formed in the tire inner peripheral surface of the region can be reduced. As a result, even if the pneumatic tire has a small aspect ratio, it is possible to restrain a crack from being generated in the inner peripheral surface in a region where a large distortion is applied during running.

In the above producing method of the pneumatic tire, it is preferable that in the forming step of the wide rubber ribbon region, a wide rubber ribbon having a width exceeding 60 mm is wound toward the outer periphery such that the wide rubber ribbon is deviated outward in the widthwise direction of the inner liner member, the formed wide rubber ribbon region is disposed on the end of the inner liner member.

According to the above method, the wide rubber ribbon region is formed by winding the wide rubber ribbon whose width exceeds 60 mm. Thus, it is possible to efficiently reduce the ribbon interface of the tire inner peripheral surface including the region extending from the end of the belt layer to the tire cross section maximum width position. The wide rubber ribbon is wound such that it is deviated in the outer side in the widthwise direction of the inner liner member toward the outer peripheral side, and the formed wide rubber ribbon region is disposed on the end of the inner liner member. With this, the ribbon interface formed between the wide rubber ribbons can be disposed in the vicinity of the inner end of the inner liner layer in the radial direction of the tire. As a result, the ribbon interface between the wide rubber ribbons is not formed in a region where a large distortion is applied during running, and it is possible to restrain a crack from being generated in the inner peripheral surface more suitably.

In the above producing method of the pneumatic tire, it is preferable that the producing method further comprises a step in which a narrow rubber ribbon having a width smaller than that of the wide rubber ribbon is spirally wound along the circumferential direction, and a narrow rubber ribbon region connected to an edge of the wide rubber ribbon region is formed.

According to the above method, it is possible to enhance the weight balance and uniformity of the inner liner member constituting the inner liner layer, and to excellently secure the uniformity of the tire even if the wide rubber ribbon is used.

DESCRIPTION OF THE PREFERRED EMBODIMENTS

Figure 1:
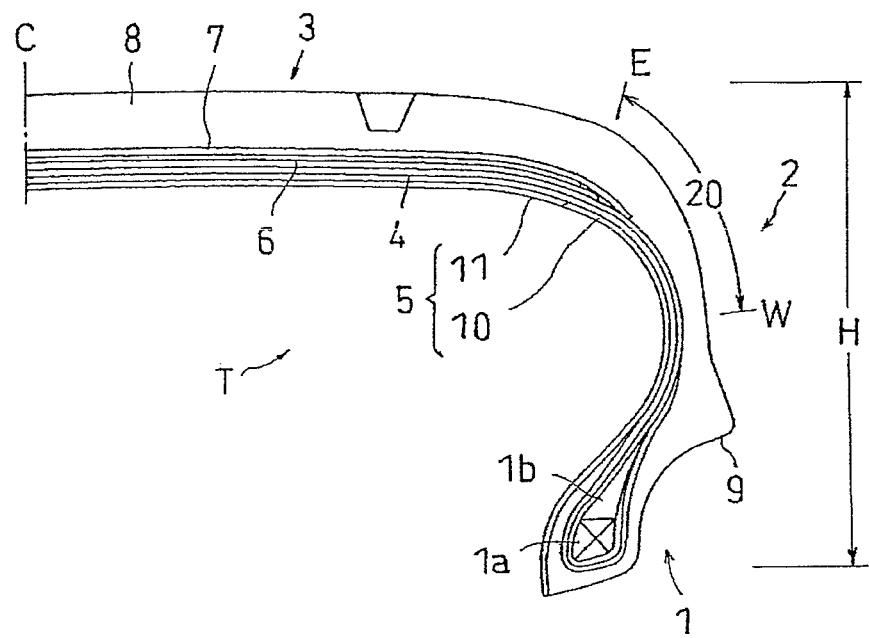
FIG. 1 is a semi-sectional view of a meridian showing one example of a pneumatic tire of the present invention.
Figure 2:
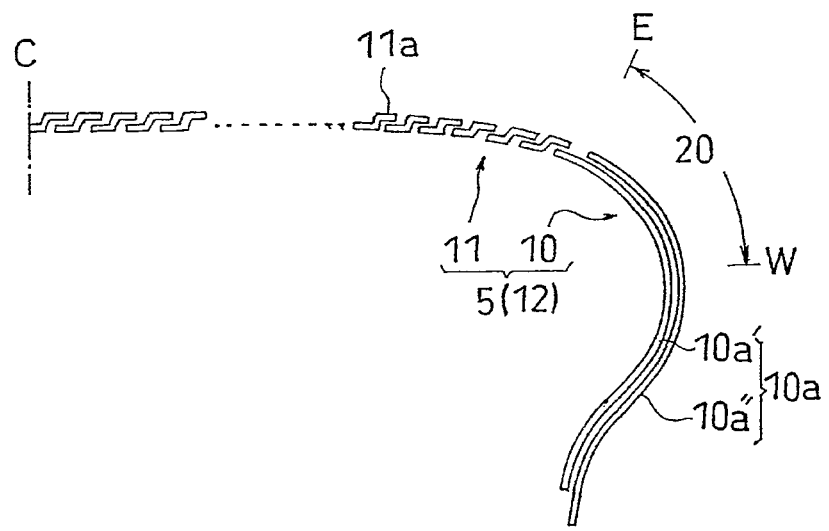
FIG. 2 is a schematic sectional view showing a structure of an inner liner layer.

An embodiment of the present invention will be explained with reference to the drawings. FIG. 1 is a semi-sectional view of a meridian showing one example of a pneumatic tire of the present invention. FIG. 2 is a schematic sectional view showing a structure of an inner liner layer.

A tire T includes a pair of bead portions 1, sidewall portions 2 respectively extending from the bead portions 1 radially outward of the tire, and a tread portion 3 connected to radially outer ends of the sidewall portions 2 through shoulder portions. An annular bead 1a which is a convergence body of a bead wire, and a bead filler 1b disposed radially outward of the bead 1a are disposed in the bead portion 1. A carcass layer 4 comprises at least one carcass ply in which cords such as polyester cords are disposed in parallel to each other at an angle of about 90° with respect to the tire equator C. In this embodiment, two carcass plies extends between the pair of beads 1a.

A belt layer 6 for reinforcing the tire by hoop effect is disposed outside of a tread portion of the carcass layer 4. The belt layer 6 is formed in such a manner that two belt plies in which steel cords are inclined by about 20° with respect to the tire equator C are laminated such that the inclination angles of the steel cords are opposite from each other. A belt reinforcing layer 7 for reinforcing the hoop effect is disposed outside of the tire of the belt layer 6, and a tread rubber 8 is disposed further outer side of the tire.

An inner liner layer 5 for holding an internal pressure of the tire is disposed on an inner side of the carcass layer 4 in the tire. The inner liner layer 5 is formed by disposing An inner liner member 12 on the tire inner peripheral surface. The inner liner layer 5 includes a wide rubber ribbon region 10 extending from the vicinity of an end E of the belt layer 6 to an inner end thereof in the radial direction of the tire, and a narrow rubber ribbon region 11 disposed in a region extending from the vicinity of the end E of the belt layer 6 to the tire equator C.

As shown in FIG. 2, the wide rubber ribbon region 10 of the embodiment is formed by spirally winding a wide rubber ribbon 10a twice along the tire circumferential direction. That is, although a wide rubber ribbon 10a" and a wide rubber ribbon 10a" are distinguished from each other for convenience sake of explanation, they are one continuous wide rubber ribbon 10a. The narrow rubber ribbon region 11 is formed by spirally winding a narrow rubber ribbon 11a many times along the tire circumferential direction. The narrow rubber ribbon 11a has a width smaller than that of the wide rubber ribbon 10a. The narrow rubber ribbon 11a is connected to an edge of the wide rubber ribbon region 10.

A tire cross section height H of the tire T is less than 110 mm. A region 20 extends from the vicinity of the end E of the belt layer 6 to the tire cross section maximum width position W. A large distortion is applied to the region 20 during running. The tire inner peripheral surface of the region 20 is formed by the wide rubber ribbon 10a' disposed in the innermost peripheral side of the wide rubber ribbons 10a constituting the wide rubber ribbon region 10. With this, the ribbon interface formed in the tire inner peripheral surface of the region 20 is reduced, and a crack which may be generated in the inner peripheral surface due to the ribbon interface is suitably restrained. Here, the tire cross section maximum width position W means a maximum width position of the tire profile in the tire meridian cross section, and a rim protector 9 swelling outward shown in FIG. 1 is not taken into consideration.

Figure 3:
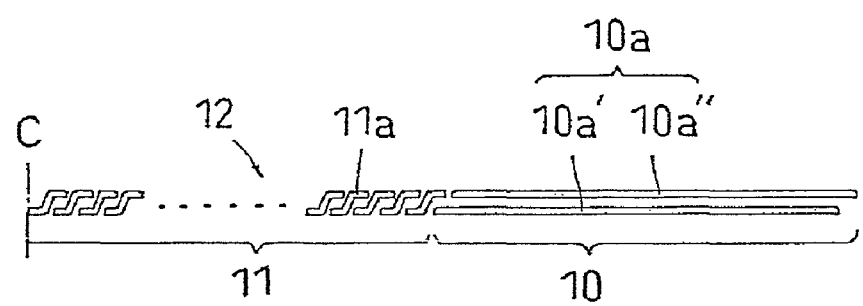
FIG. 3 is a schematic sectional view showing a structure of an inner liner member.

Next, a producing method of the pneumatic tire will be explained. First, the inner liner member 12 shown in FIG. 3 is formed on an outer peripheral surface of a forming drum. More specifically, the wide rubber ribbon 10a is spirally wound along the tire circumferential direction to form the wide rubber ribbon region 10, the narrow rubber ribbon 11a is similarly wound, the narrow rubber ribbon 11a is connected to an edge of the wide rubber ribbon region 10 to form the narrow rubber ribbon region 11. At that time, the wide rubber ribbon region 10 is formed such that the wide rubber ribbon 10a is deviated and wound in the outer side in the widthwise direction (rightward in FIG. 3) of the inner liner member 12 toward the outer peripheral side, and the wide rubber ribbon region 10 is disposed on the end of the inner liner member 12. The wide rubber ribbon 10a' of the innermost peripheral side is disposed such as to form at least the tire inner peripheral surface of the region 20 when the tire is formed.

Figure 4:
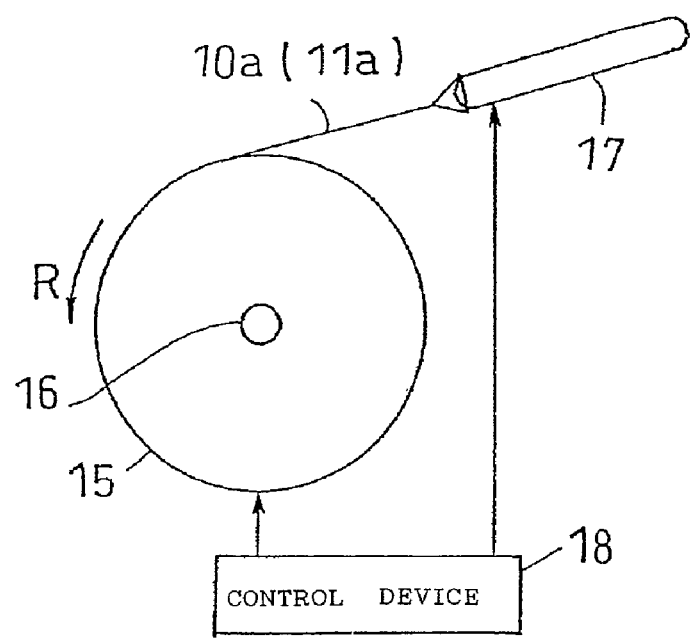
FIG. 4 is a schematic view of a structure showing a device which winds a rubber ribbon.

The inner liner member 12 can be formed using a device shown in FIG. 4 for example. The forming drum 15 can rotate in the R-direction around a shaft 16. The forming drum 15 can move horizontally in an axial direction of a drum by a moving mechanism (not shown). A rubber ribbon supply apparatus 17 includes an extruder which can extrude a rubber ribbon through a die having a predetermined shape. The rubber ribbon supply apparatus 17 has a function for supplying the wide rubber ribbon 10a or the narrow rubber ribbon 11a to the forming drum 15. A control device 18 has a function for controlling the operation of the rubber ribbon supply apparatus 17, and rotation and horizontal motion of the forming drum 15.

According to the above apparatus, a winding-start end of the wide rubber ribbon 10a is fixed to the outer peripheral surface of the forming drum 15, the forming drum 15 is horizontally moved while rotating the same, the wide rubber ribbon 10a is wound and the wide rubber ribbon region 10 can be formed. Then, a winding-start end of the narrow rubber ribbon 11a is fixed to the edge of the wide rubber ribbon region 10 and the narrow rubber ribbon region 11 can be formed in the same manner. The rotation speed and the horizontal motion speed of the forming drum 15 are appropriately controlled by the control device 18, and the inner liner member 12 having predetermined size and cross section shape is formed.

The cross section shapes of the wide rubber ribbon 10a and the narrow rubber ribbon 11a are not especially limited, and a laterally long rectangular shape or trapezoidal shape can be employed. The narrow rubber ribbon region 11 may be formed first, and the wide rubber ribbon region 10 may be formed such as to be connected to the edge of the narrow rubber ribbon region 11. When the wide rubber ribbon region 10 is formed first, it is preferable that the cross section shape of the wide rubber ribbon 10a is trapezoidal shape. With this, it becomes easy to wind the narrow rubber ribbon 11a around the edge of the wide rubber ribbon region 10, and a step in a joint can be suppressed.

It is preferable that a deviation amount of the wide rubber ribbon 10a is 10 mm or less, more preferably 5 mm or less, and the wide rubber ribbon 10a is spirally wound. If the deviation amount exceeds 10 mm, a space where the wide rubber ribbon 10a is not disposed is relatively largely formed in the vicinity of the winding-start end and a winding-completion terminal end of the wide rubber ribbon 10a in some cases, and this is not preferable for holding the internal pressure of the tire. If the deviation amount is 0 mm, a step is generated in the joint with respect to the narrow rubber ribbon 11a which is to be connected to the edge, and the uniformity is deteriorated in some cases.

After the inner liner member 12 is formed, the same step as the conventional tire producing step can be carried out. That is, a carcass ply having a predetermined width is wound around the outer periphery of the inner liner member 12 and the carcass ply is formed into a cylindrical shape, an end of the carcass ply is wound up around the end of the carcass ply through beads 1a which is fitted over the end and then, a central portion of the carcass ply is swelled and deformed while reducing a distance between the beads 1a. With this operation, a central portion of the inner liner member 12 is also swelled and deformed, and the inner liner member 12 is deformed into a shape extending along the tire inner peripheral surface as shown in FIG. 2 from the shape shown in FIG. 3.

Then, a belt layer 6, a belt reinforcing layer 7 and the tread rubber 8 are disposed outside of the tread portion 3 of the carcass ply, another rubber member is pasted if necessary and a raw tire is formed. The inner liner member 12 is disposed on the tire inner peripheral surface and becomes the inner liner layer 5. At least the tire inner peripheral surface of the region 20 is formed by the wide rubber ribbon 10a' of the innermost peripheral side.

The above-described crack suppressing effect of the inner peripheral surface is exhibited when the wide rubber ribbon 10a' forms the tire inner peripheral surface of the region 20. The end of the wide rubber ribbon 10a' in the inner side in the widthwise direction of the tire reaches the inner side 15 mm in the widthwise direction of the tire from the end E of the belt layer 6. With this, it is possible to reliably reduce the ribbon interface near the end E of the belt layer 6 of the region 20, and to effectively suppress the crack of the inner peripheral surface.

It is preferable that the width of the wide rubber ribbon 10a exceeds 60 mm, and more preferably exceeds 70 mm. With this, the ribbon interface can efficiently be reduced, the wide rubber ribbon region 10 can be formed with a small number of winding times, and the ribbon interface formed between the wide rubber ribbons 10a can be reduced. In a pneumatic tire in which the tire cross section height is less than 110 mm, if the width of the wide rubber ribbon 10a is 110 mm, the tire inner peripheral surface of the region 20 can sufficiently be formed. It is preferable that the width of the narrow rubber ribbon 11a is less than 30 mm, and the width thereof in the embodiment exceeds 15 mm and less than 30 mm. With this, the narrow rubber ribbon region 11 can be formed precisely, and the inner liner member 12 having excellent uniformity can precisely be formed.

In this embodiment, the wide rubber ribbon region 10 is formed by spirally winding the wide rubber ribbon 10a twice. With this, it is possible to reduce the ribbon interface formed between the wide rubber ribbons 10a to a minimum, to effectively suppress the crack of the inner peripheral surface, and to shorten the forming time of the wide rubber ribbon region 10.

When the wide rubber ribbon region is formed by winding the rubber extrudate once, it is necessary to prepare a different die in accordance with a tire size, but if the wide rubber ribbon 10a is spirally wound a plurality of times as in this embodiment, tires of various sizes can be handled with a single die, and this is advantageous in terms of cost and operability. The thickness of the wide rubber ribbon 10a becomes relatively small, a step in the joint of the tire circumferential direction is reduced and this is advantageous in terms of uniformity of the inner liner member 12.

In this embodiment, the wide rubber ribbon region 10 is formed by winding the wide rubber ribbon 10a such that the wide rubber ribbon 10a is deviated radially inward of the tire toward the outer side of the tire, and the wide rubber ribbon region 10 is disposed from the vicinity of the end E of the belt layer 6 to the radially inner end of the tire. With this, the ribbon interface formed between the wide rubber ribbon 10a' and the wide rubber ribbon 10a" is disposed near the tire radially inner end of the inner liner layer 5. As a result, the ribbon interface is not formed near the region 20, and it is possible to prevent a crack from being generated in the inner peripheral surface more suitably.

In the present invention, the thickness of each of the rubber ribbons 10a and 11a is not especially limited, the rubber ribbons 10a and 11a may have appropriate thicknesses suitable for the inner liner member 12. In the embodiment, the thickness of the wide rubber ribbon 10a is in a range of 0.4 to 1.0 mm.

Another Embodiment

In the above embodiment, the wide rubber ribbon region 10 is wound such that the wide rubber ribbon 10a is deviated radially inward toward the outer side of the tire when the tire is to be formed and such that the wide rubber ribbon 10a is deviated to the outer side in the widthwise direction of the inner liner member 12 toward the outer periphery when the inner liner member is to be formed. The deviating direction of the wide rubber ribbon 10a may be opposite from that described above. In such a case, it is preferable that the ribbon interface formed between the wide rubber ribbons 10a is disposed inward in the widthwise direction of the tire than the end E of the belt layer 6.

Examples

To concretely show the effect of the invention, an endurance test was carried out. The test will be explained below. The test was carried out in accordance with a method specified in JISD4230, and a relation between traveled distance and trouble was searched using test tires of tire size 205/40R17 80V (tire cross section height of 80 mm) having a tire structure shown in FIG. 1.

A pneumatic tire having an inner liner layer comprising an inner liner member formed using only the narrow rubber ribbon (width of 18 mm and thickness of 1.2 mm) was used as a conventional example. As shown in the above embodiment, a pneumatic tire having an inner liner layer comprising an inner liner member formed using the narrow rubber ribbon and the wide rubber ribbon (width of 95 mm and thickness of 0.6 mm) was used as the embodiment. A result of the test is shown in Table 1.

TABLE 1

|  | Conventional example | Embodiment |
| --- | --- | --- |
| Traveled distance/trouble | 7000 km/inner surface crack | 12000 km/no trouble |

As shown in Table 1, in the conventional example, when the traveled distance exceeds 7000 km, a crack was found in the tire inner peripheral surface. This crack was generated in the tire inner peripheral surface of a region extending from the vicinity of the end of the belt layer to the tire cross section maximum width position in the circumferential direction along the interface of the rubber ribbon. In the embodiment, trouble such as a crack was not found even when the traveled distance exceeds 12000 km. From the above result, it can be found that a crack is prevented from being generated in the inner peripheral surface and the endurance is more excellent as compared with the conventional example.

What is claimed is:

1. A producing method of a pneumatic tire comprising:
    disposing a carcass layer such as to extend between a pair of beads;
    forming an inner liner layer;
    disposing the inner liner layer on a tire inner peripheral surface, said inner liner layer comprises a wide rubber ribbon region formed with a wide rubber ribbon spirally wound a plurality of times along a circumferential direction, a tire inner peripheral surface of a region extending at least from the vicinity of an end of a belt layer to a tire cross section maximum width position is formed by the wide rubber ribbon of an innermost peripheral side, said region having portion overlapping with the belt layer, and having the carcass layer therebetween such that said region is disposed on the inner side in the tire width direction from the belt layer
    wherein in the forming step of the wide rubber ribbon region, a wide rubber ribbon having a width exceeding 60 mm is wound toward the outer periphery such that the wide rubber ribbon is deviated outward in the widthwise direction of the inner liner member, the formed wide rubber ribbon region is disposed on the end of the inner liner member, and
    spirally winding a narrow rubber ribbon having a width smaller than that of the wide rubber ribbon a plurality of times along the circumferential direction so as to form a narrow rubber ribbon region connected to an edge of the wide rubber ribbon region.

* * * * *